April 7, 1964     D. L. BABCOCK ETAL     3,127,823
SIGNAL APPARATUS FOR PHOTOGRAPHIC CAMERAS
Filed Aug. 8, 1962     2 Sheets-Sheet 1

David L. Babcock
Allen G. Stimson
Joseph L. Byrd
INVENTORS

BY R. Frank Smith
Robert W. Hampton
ATTORNEYS

April 7, 1964 D. L. BABCOCK ETAL 3,127,823
SIGNAL APPARATUS FOR PHOTOGRAPHIC CAMERAS
Filed Aug. 8, 1962 2 Sheets-Sheet 2
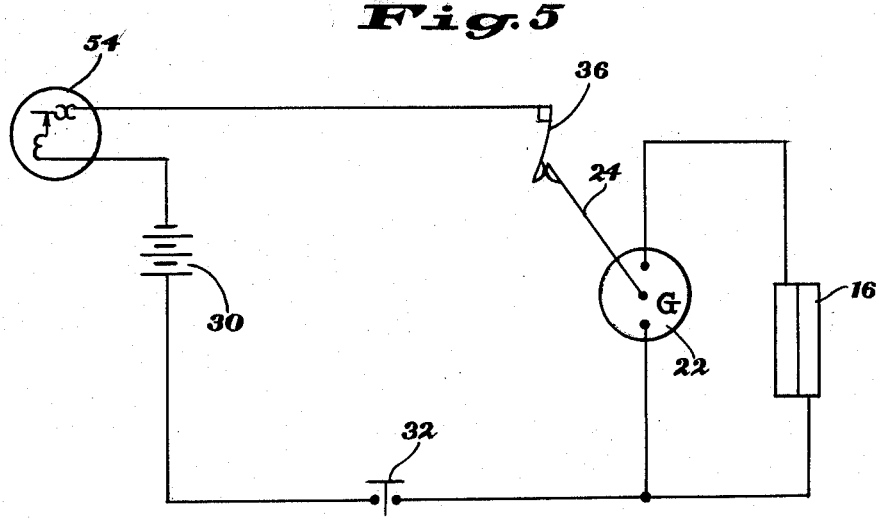
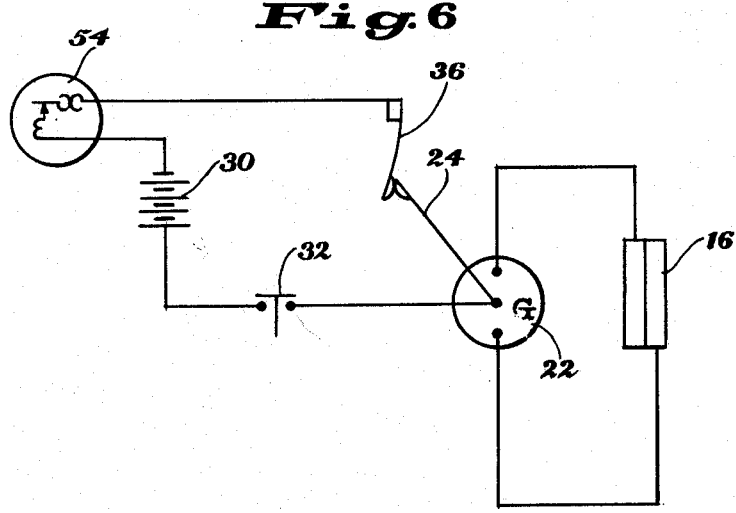
David L. Babcock
Allen G. Stimson
Joseph L. Byrd
INVENTORS
BY R. Frank Smith
Robert W. Hampton
ATTORNEYS

United States Patent Office 3,127,823
Patented Apr. 7, 1964

3,127,823
SIGNAL APPARATUS FOR PHOTOGRAPHIC CAMERAS
David L. Babcock and Allen G. Stimson, Rochester, N.Y., and Joseph L. Byrd, Columbus, Ohio, assignors to Eastman Kodak Company, Rochester, N.Y., a corporation of New Jersey
Filed Aug. 8, 1962, Ser. No. 219,355
16 Claims. (Cl. 95—10)

This application is a continuation-in-part of our copending application Serial No. 124,991, filed July 18, 1961, now abandoned.

The present invention relates to photographic cameras and more particularly concerns flashing low-light signals for cameras having photoelectric exposure control systems.

In the prior art there are numerous devices for indicating in the viewfinder of a camera that the field brightness is above or below the normal exposure range of a photoelectric exposure control system in the camera. These signals are usually generated by modulating or transmitting field light to apprise the operator of the off-range level of that light. In the case of low field brightness the field light is at a low intensity when the signal is required; therefore, the prior art devices referred to have been found inadequate in that the signals generated by them are difficult or impossible to see at the very time they are needed.

It is a primary object of the present invention to flash an electric lamp automatically in response to the sensing of low field brightness.

Another object of the invention is to transmit a flashing signal into the viewfinder of a camera when field brightness is less than a predetermined low value.

Another object of the invention is to provide an improved low-light signal for use in a camera, an exposure meter or other device.

Other objects of the invention will appear from the following description, reference being made to the accompanying drawings, wherein:

FIGS. 5 and 6 are circuit diagrams of additional forms of the invention.

Figure 1:
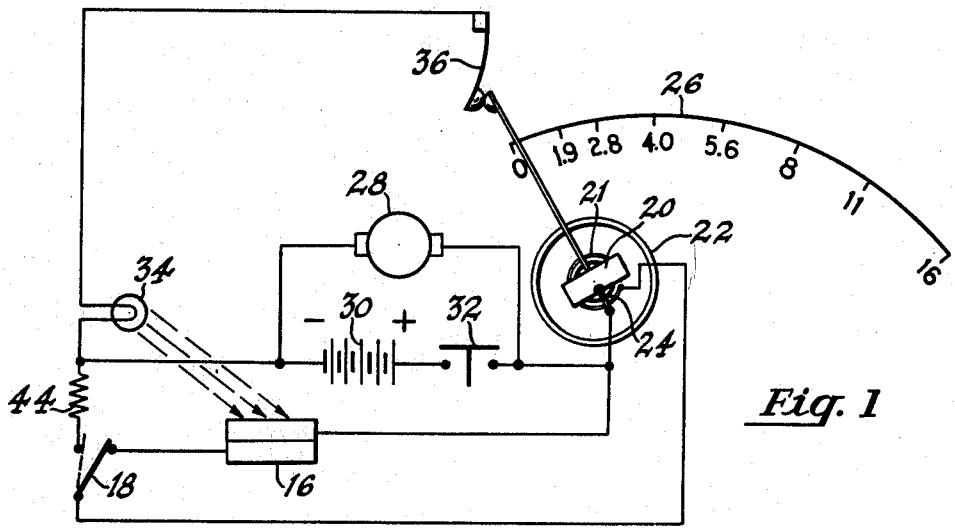
FIG. 1 is a partially schematic view of a circuit embodying one form of the invention.
Figures 2, 4:
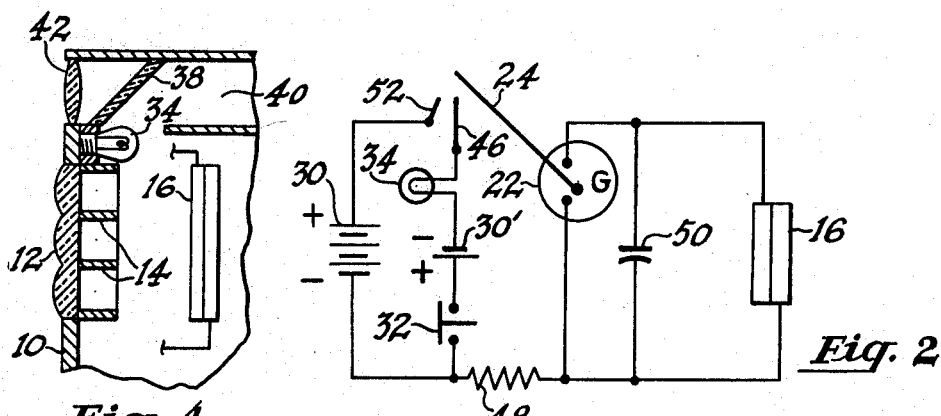
FIG. 2 is a circuit diagram of a second form of the invention.
FIG. 4 is a partial right side view of a camera front, in section, illustrating a preferred disposition of the flashing lamp relative to the camera viewfinder and photocell.

In one realization of the present invention it operates on the principle of negative feedback to the camera's electric lamp. Referring to FIGS. 1 and 4 a camera structure illustrating the invention has mounted in its front cover 10 a lens block 12 and baffles 14 aligned with a photocell 16, such as a selenium cell. Cell 16 is exposed to scene or field light through baffles 14 and lens block 12 and is connected through a normally closed switch 18 to opposite sides of a rotatably mounted coil 20 of a galvanometer, or electric measuring instrument 22. Together, galvanometer 22 and the cell 16 constitute a photoelectric exposure meter. One terminal of the coil 20 is connected to cell 16 through a conducting pointer 24 which is movable with coil 20. The other terminal of coil 20 is connected to cell 16, preferably through a control spring 21, which biases coil 20 and pointer 24 counterclockwise toward their initial, or "0" scale positions.

In a manner well known in the art, the coil 20 is deflected under photocell energization, from an initial position indicated at "0" on a scale 26, to an up-scale position which is a function of field brightness. This deflection occurs against the tension of spring 21. The coil of the pointer, which move together, may be employed in any of a variety of well known structural systems for automatically or semiautomatically regulating exposure of film in the camera in response to changes in field brightness. For purposes of simplicity, the galvanometer 22 in the accompanying drawings is illustrated only as an indicating instrument cooperating with scale 26.

A camera motor 28 may be employed for driving a shutter mechanism (not shown) or the like in a motion picture camera and is illustrated schematically in FIG. 1 as an electric motor powered by a battery 30 in a circuit which is completed by manual operation of a pushbutton switch 32. While switch 32 remains closed, a lamp 34 is flashed in response to the sensing of low field brightness, as follows.

When prevailing field brightness falls to a predetermined low level, pointer 24 of the galvanometer 22 is moved by spring 21 to or near its initial position, as shown in FIG. 1. Near this position, pointer 24 engages a contact 36, which is electrically connected through lamp 34 to one terminal of battery 30. It will be seen that pointer 24 and contact 36 together constitute a switch, which is closed at low-light conditions. If the pushbutton switch 32 is closed at this time, a circuit is completed from the battery back to the instrument pointer 24, thereby energizing lamp 34. Light from lamp 34 illuminates cell 16, thereby increasing the energization of coil 20 and moving pointer 24 clockwise away from contact 36 to reopen the lamp circuit. However, because field brightness is at a low level, pointer 24 immediately returns to its initial position, re-engaging contact 36 and re-energizing lamp 34. The foregoing operation occurs in a cyclic or repetitive manner to cause a flashing of the lamp. Light from lamp 34 apprises the camera operator of the prevailing low field brightness, for example by being reflected from a half-silvered mirror 38 (FIG. 4) into a viewfinder 40, the front lens of which is illustrated at 42.

For testing the battery voltage, switch 18 may be moved to its broken line position, thereby completing a circuit from battery 30, through a current limiting resistor 44, switch 18, coil 20, pointer 24, switch 32 and back to battery 30. In such a circuit, the deflection of the instrument pointer 24 on scale 26 indicates the potential difference across battery 30.

In the embodiment illustrated in FIG. 2, the flashing signal operates on the principle of alternately positive and negative feedback. When the instrument pointer 24 moves to or near its initial position in response to diminution of field brightness to an off-scale level, it first engages a flexible contact 46 to close a first circuit. Current from a portion of the battery, which is divided into two segments illustrated at 30 and 30', is conducted in the first circuit through lamp 34, contact 46, pointer 24, a resistor 48 and the actuating switch 32. The current from the smaller segment 30' of the battery is insufficient to illuminate the lamp. However, some of the current flowing through the above described first circuit charges a capacitor 50, which is connected in parallel with the galvanometer 22. As the capacitor charge increases, current flow through the galvanometer coil increases.

Battery segment 30' is of such polarity with respect to galvanometer 22 as to aid spring 21 (FIG. 1) in causing the downscale movement of pointer 24; therefore, pointer 24 moves further downscale until it and flexible contact 46 engage a stationary contact 52, thereby completing a second circuit to connect lamp 34 in series with segments 30 and 30' of the battery, which further energizes and now illuminates the lamp. Battery segment 30, which is larger than battery segment 30', reverses the current through resistor 48 and the galvanometer coil, but pointer 24 remains in engagement with contacts 46 and 52 until the charge on capacitor 50 is reversed. Therefore, the illumination time of the lamp is determined by the values of resistor 48 and capacitor 50, the voltages of the battery segments 30 and 30' and the resistance of the galvanometer coil.

When the downscale instrument torque has decreased until pointer 24 and flexible contact 46 move away from stationary contact 52, the lamp goes out and feedback reverts to the positive type described for the first circuit to complete a flashing cycle, which then repeats in the manner described above. From the foregoing, it will be seen that pointer 24 and contact 46 constitute a switch for the first circuit, and that contacts 46 and 52 constitute a switch for the second circuit.

Figure 3:
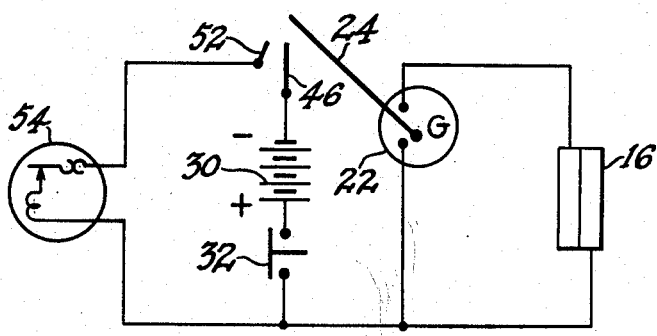
FIG. 3 is a circuit diagram of a third form of the invention.

Referring to FIG. 3, a third embodiment of the invention employs a standard bimetallic element flashing lamp 54 in place of the incandescent lamp 34. When the galvanometer pointer 24 engages the flexible contact 46 at low field brightness, current through switch 32 and the galvanometer increases the downscale torque, thereby moving contact 46 into engagement with stationary contact 52. This completes a parallel battery circuit through switch 32 and flasher 54, energizing the latter, which then flashes intermittently to apprise the camera operator of the low field brightness.

FIGS. 5 and 6 show two other embodiments of the invention each employing a bimetallic flashing lamp 54, and each utilizing the galvanometer pointer 24 as a switch for completing a circuit including battery 30 and flashing lamp 54 when the pointer 24 engages contact 36 at low scene brightness. In FIG. 5 the galvanometer is shown in series with battery 30 and flashing lamp 54, and in FIG. 6, only the conducting pointer 24 of the galvanometer 22 is in circuit with the lamp 54 and the battery 30.

The invention has been described in detail with particular reference to preferred embodiments thereof, but it will be understood that variations and modifications can be effected within the spirit and scope of the invention as described hereinabove and as defined in the appended claims.

We claim:

1. In a photographic camera, a signal device comprising: a photoelectric-to-mechanical transducer including a photoresponsive element adapted to be exposed to field light, a member deflectable under control of said element in a first direction as a function of field brightness and means urging said member in a second, opposite direction; an electric lamp; and feedback means operable in response to movement of said member to a predetermined position for intermittently energizing said lamp to generate a flashing light signal for identifying a predetermined level of field brightness.

2. The signal device defined in claim 1, with: a viewfinder; and means for transmitting said flashing signal into said viewfinder.

3. The signal device defined in claim 1, with: a resistor and a capacitor in circuit with said lamp to control the flashing frequency of said lamp.

4. In a photographic camera, a signal device comprising: a photoelectric-to-mechanical transducer including a photoresponsive element adapted to be exposed to field light, a member deflectable under control of said element in a first direction as a function of field brightness and means urging said member in a second, opposite direction; an electric lamp; means operable in response to movement of said member to a predetermined position for energizing said lamp; and means operable in response to energization of said lamp for moving said member away from said predetermined position to de-energize said lamp, whereby said lamp generates a flashing light signal to identify a predetermined level of field brightness.

5. In a camera, circuit means for apprising the camera operator of a prevailing low field brightness, said circuit means comprising: a galvanometer with a movable pointer; a photocell adapted to be exposed to field light for energizing said galvanometer to move said pointer as a function of field brightness; a battery; a switch; means for closing said switch in response to movement of said pointer to a position corresponding to low field brightness; and an electric lamp energizable by said battery to generate light in response to closure of said switch, said lamp being disposed such that light generated thereby is visible to the camera operator and illuminates said photocell to increase the energization of said galvanometer, thereby moving said pointer for opening said switch.

6. The apparatus defined in claim 5, with: a normally open second switch in said circuit; and manually operable means for closing said second switch during operation of said camera.

7. In a photographic camera, a circuit for warning the camera operator of prevailing low field brightness, comprising: a photocell adapted to be exposed to field light; a galvanometer energizable by said photocell, said galvanometer including a pointer deflectable in a first direction as a function of field brightness and a spring for urging said pointer in a second, opposite direction; a lamp adapted upon energization thereof to generate light, said lamp being disposed such that light therefrom is visible to the camera operator; a battery; and a switch contact engageable by said pointer, when the latter assumes a position corresponding to low field brightness, for completing said circuit to energize said lamp, said photocell being disposed for illumination by said lamp light for increasing the energization of said galvanometer, thereby moving said pointer in said first direction to open said switch for de-energizing said lamp.

8. In a photographic camera having a photocell adapted to be exposed to field light and having a galvanometer energizable by said photocell, said galvanometer including a pointer deflectable in a first direction as a function of field brightness and a spring for urging said pointer in a second, opposite direction, apparatus for warning the camera operator of prevailing low field brightness, said apparatus comprising: a first electric circuit including (1) said pointer, (2) a lamp adapted upon energization thereof to generate light, said lamp being disposed such that light therefrom is visible to the camera operator, (3) a first switch, (4) means for closing said first switch in response to movement of said pointer to a position corresponding to low field brightness, and (5) a first source of electrical energy for energizing said galvanometer in aiding relation to said spring, in response to closure of said first switch; and a second electrical circuit including (1) a normally open second switch, (2) means for closing said second switch in response to energization of said galvanometer by said first source, and (3) a second source of electrical energy operable, in response to closure of said second switch, for energizing said lamp and for energizing said galvanometer in overriding opposition to said first source, said galvanometer being operable, in response to said last-named energization thereof, for opening said second switch.

9. The combination defined in claim 8, wherein said first and second sources comprise respective segments of a battery.

10. The combination defined in claim 8, wherein said first switch comprises said pointer and a flexible contact, and wherein said second switch comprises said flexible contact and a stationary contact.

11. The combination defined in claim 8, with: a normally open third switch in said first circuit; and means for closing said third switch during operation of said camera.

12. The combination defined in claim 8, with a resistor and a capacitor in said first circuit for controlling the flashing frequency of said lamp.

13. In a photographic camera having a photocell adapted to be exposed to field light and having a galvanometer energizable by said photocell, said galvanometer including a pointer deflectable in a first direction as a function of field brightness and a spring for urging said pointer in a second, opposite direction, apparatus for warning the camera operator of prevailing low field brightness, said apparatus comprising: a first electric circuit including (1) said pointer, (2) a first switch, (3) means for closing said first switch in response to movement of said pointer to a position corresponding to low field brightness, and (4) a battery for energizing said galvanometer in aiding relation to said spring, in response to closure of said first switch; and a second electrical circuit including (1) said battery; (2) a normally open second switch; (3) a thermoelectric flashing lamp adapted upon energization thereof to generate a flashing light, said lamp being disposed such that light therefrom is visible to the camera operator; and (4) means for closing said second switch to energize said lamp, in response to energization of said galvanometer by said battery.

14. The combination defined in claim 13, with: a normally open third switch common to both of said circuits; and means for closing said third switch during operation of said camera.

15. The combination defined in claim 13, wherein said first switch comprises said pointer and a flexible contact, and wherein said second switch comprises said flexible contact and a stationary contact.

16. In a photographic camera, a signal device comprising: a photoelectric-to-mechanical transducer including a photo-responsive element illuminatable by field light and a member positionable under control of said element as a function of field brightness; a normally unenergized source of flashing light visible to the camera operator; a battery electrically in circuit with said light source for energizing said source; and an electrical switch means operable in response to movement of said member to a predetermined position corresponding to low field brightness for completing said circuit including said battery and said light source to produce a flashing light signal, said switch means being arranged for disconnecting said light source from said battery upon movement of said member away from said predetermined position for stopping said flashing light signal.

References Cited in the file of this patent
UNITED STATES PATENTS

| | | |
|---|---|---|
| 3,003,389 | Stimson | Oct. 10, 1961 |
| 3,041,949 | Buhrle | July 3, 1962 |
| 3,043,203 | Buhrle | July 10, 1962 |